(12) United States Patent
Kurchuk

(10) Patent No.: US 10,218,404 B2
(45) Date of Patent: Feb. 26, 2019

(54) INTERCONNECT ELEMENT CIRCUITRY FOR RF ELECTRONICS

(71) Applicant: Nokia Solutions and Networks Oy, Espoo (FI)

(72) Inventor: Boris A. Kurchuk, Bridgewater, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/473,058

(22) Filed: Mar. 29, 2017

(65) Prior Publication Data

US 2018/0287654 A1    Oct. 4, 2018

(51) Int. Cl.
  *H04B 1/18*    (2006.01)
  *H04B 1/40*    (2015.01)

(52) U.S. Cl.
  CPC ..................................... *H04B 1/40* (2013.01)

(58) Field of Classification Search
  CPC .............. H04B 1/40; H04B 1/18; H04B 1/48
  USPC .......................................... 455/26.1, 78, 79
  See application file for complete search history.

(56) References Cited

U.S. PATENT DOCUMENTS

| | | |
|---|---|---|
| 5,952,952 A | 9/1999 | Choi et al. |
| 6,441,671 B1 | 8/2002 | Rastegar |
| 8,774,067 B2 * | 7/2014 | Rousu ..................... H01Q 1/242 333/126 |
| 2004/0065912 A1 | 4/2004 | Liu et al. |
| 2014/0210536 A1 | 7/2014 | Kurchuck |

OTHER PUBLICATIONS

"Revolutionary RF Ceramic Filter for Next Generation Communication," https://www.rfglobalnet.com, 2013 [retrieved on Mar. 8, 2017] Retrieved from the Internet: <URL: https://www.rfglobalnet.com/doc/waveguide-ceramic-filter-clearplex-datasheet-0001> (1 page).

(Continued)

Primary Examiner — Tuan H Nguyen
(74) Attorney, Agent, or Firm — Mendelsohn Dunleavy, P.C.; Steve Mendelsohn

(57) ABSTRACT

In one embodiment, interconnect element (IE) circuitry electrically interconnects electronic components (e.g., a transceiver and a filter or a filter and an antenna). The IE circuitry has an inductive signal path and a grounded, inductive return path, where at least one actively controlled impedance-compensation element, electrically interconnecting the signal and ground paths, is controllable to selectively provide different impedance levels, such that overall impedance of the IE circuitry is controllable to achieve low pass-band insertion loss and high stop-band attenuation between the electronic components without requiring expensive RF connectors to connect the IE circuitry to the electronic components and an RF filter to provide stop-band attenuation. In a T-filter configuration, the IE circuitry has only one impedance-compensation element; in a Pi-filter configuration, the IE circuitry has two impedance-compensation elements. Each impedance-compensation element has at least one controllable device such as a varactor diode, a switched-capacitor array, or a tunable capacitor.

19 Claims, 8 Drawing Sheets

(56) References Cited

OTHER PUBLICATIONS

Zhang, Yulan, et al., "Adaptive RF Power Amplifier Tuned with Ferroelectric BST Varactor," PIERS—Progress in Electromagnetics Research Symposium Proceedings, Marrakesh, Morocco, 2011, pp. 999-1002.

Martinez, Félix L., et al., "Dielectric Constant Tunability at Microwave Frequencies and Pyroelectric Behavior of Lead-Free Submicrometer-Structured $(Bi0.5Na0.5)1-xBaxTiO3$ Ferroelectric Ceramics," IEEE Transactions on Ultrasonics, Ferroelectrics, and Frequency Control, vol. 60, No. 8, 2013, pp. 1595-1602.

\* cited by examiner

100

200

700

800

900

INTERCONNECT ELEMENT CIRCUITRY FOR RF ELECTRONICS

BACKGROUND

Field of the Invention

The present invention relates to RF (radio frequency) electronics and, more particularly but not exclusively, to interconnect element circuitry for RF electronics, such as transceivers used in RF communications equipment.

Description of the Related Art

This section introduces aspects that may help facilitate a better understanding of the invention. Accordingly, the statements of this section are to be read in this light and are not to be understood as admissions about what is prior art or what is not prior art.

Front-end, high-power RF filters, including duplexers and multiplexers, are key components of RF wireless communication terminals, such as base stations, handsets, IoT (Internet of Things) terminals, and others. Such filters should have low insertion loss in the pass-bands, high attenuation in the stop-bands up to very high frequency, and be able to withstand high-power RF signals. Such high-power RF filters are not typically produced with the same manufacturing processes as the analog and digital components in RF transceivers. As such, special interconnect elements (IEs) are used to connect such filter modules to other components such as RF transceivers and antennas. Although the abbreviation "RF" stands for "radio frequency," as used herein, the term "RF" refers to any suitable communications frequency or frequency band and is not limited to any specific frequency range of the electromagnetic spectrum.

Moving forward to next-generation wireless equipment, RF designers face the challenges of simultaneously satisfying multiple design goals, including the following:

Increased operating transmit (Tx) and receive (Rx) frequencies (moving to mm-wave frequencies);
Increased number of RF channels (moving to M-MIMO (massive multiple-in, multiple-out) architectures);
Reduced size, weight, and cost of equipment.

FIG. 1 is a high-level block diagram of a set of prior-art RF electronics 100 having three conventional interconnect elements (IEs) 120. RF electronics 100 includes a ceramic duplexer filter 130 connected to (i) a transceiver (TRx) board 110 using two IEs 120(1) and 120(2) and to (ii) an antenna 140 using a third IE 120(3). As represented in FIG. 1, each interconnect element 120 is a coaxial RF cable having an inner signal path 122 and a grounded, outer return path 124. The signal path 122 is connected to other components (e.g., TRx board 110, filter 130, and/or antenna 140) using RF connectors 126, and the return path 124 is connected to ground also using RF connectors 126. An RF connector is typically a coaxial electrical connector designed to work at radio frequencies in the multi-megahertz range. RF connectors are typically used with coaxial transmission lines (coaxial cables) or waveguides.

RF connectors are typically standard, off-the-shelf products, usable for multiple applications across a wide frequency range. In order to achieve good RF performance with low pass-band insertion loss and low signal reflection over a wide frequency range, the coaxial cable 122/124 and RF connectors 126 should be designed to provide stable (e.g., 50-ohm) impedance matching with the other components over a wide frequency range. However, since the wideband RF connectors 126 are relatively expensive, using the interconnect elements 120 of FIG. 1 in applications such as M-MIMO architectures that have many IEs 120 and therefore many RF connectors 126, becomes cost prohibitive.

FIG. 2 is a high-level block diagram of another set of prior-art RF electronics 200 having three conventional interconnect elements 220. Like RF electronics 100 of FIG. 1, RF electronics 200 includes a ceramic duplexer filter 230 connected to (i) a transceiver board 210 using two IEs 220(1) and 220(2) and to (ii) an antenna 240 using a third IE 220(3). As represented in FIG. 2, each interconnect element 220 is two parallel transmission lines: one configured as the signal path 222 and the other configured as the grounded return path 224.

Each interconnect element 220 is fabricated as an internally matched, wideband structure, where distributed inductance of the signal path 222 and the return path 224 is compensated by the distributed capacitance between the signal path 222 and the grounded return path 224. In particular, the overall inductance and capacitance of each IE 220 are designed to provide the desired level of impedance matching without requiring RF connectors, such as RF connectors 126 of FIG. 1. As such, each IE 220 can be connected to other components (e.g., TRx board 210, filter 230, and/or antenna 240) with simple joints 226 (e.g., solder connections or mechanical connections), rather than using RF connectors.

Because the components in RF electronics 200 can be interconnected using interconnect elements 220 without needing expensive RF connectors, RF electronics for applications such as M-MIMO architectures can be produced more cost-effectively. However, any variation of characteristic impedance of the IEs 220 (for example, variation of inductance of the conductors in the signal path 222 and/or in the return path 224) due to, for example, manufacturing, temperature, and/or aging variation, can degrade the performance of the RF filter 230 and RF transceiver 210. Furthermore, uncontrolled impedance variation of IEs 220 can also introduce some parasitic resonances in the connected RF filter 230, which can additionally degrade the RF filter performance and, as a result, the RF transceiver performance, for example, by degrading pass-band insertion loss and/or stop-band attenuation at and close to the resonant frequencies.

SUMMARY

Problems in the prior art are addressed in accordance with the principles of the present invention by low-cost, high-performance interconnect element circuitry for RF electronics, where the IE circuitry can have an actively controlled frequency response. In particular, the frequency response of IE circuitry can be actively controlled to achieve both low pass-band insertion loss and high stop-band attenuation for the lifetime of the RF electronics. These goals are achieved by controlling the impedance of one or more elements in the IE circuitry to provide good impedance matching within the pass-band, which reduces insertion loss, and significant impedance mismatching at certain frequencies outside of the pass-band, such as at high frequencies above the pass-band, which increases stop-band attenuation.

In some embodiments, the present invention is an article of manufacture comprising electronics comprising a first electronic component, a second electronic component, and first interconnect element (IE) circuitry providing an electrical connection between the first and second electronic components. The first IE circuitry comprises a signal path electrically connected between the first and second electronic components and having a signal-path inductance; a return path electrically connected to ground and having a return-path inductance; and a first, actively controlled impedance-compensation element electrically connected between first ends of the signal and ground paths and adapted to be controlled to selectively provide different impedance levels, such that impedance of the first IE circuitry is controllable to achieve low pass-band insertion loss and high stop-band attenuation between the first and second electronic components.

In some embodiments of the above, the first IE circuitry is electrically connected to the first and second electronic components via joints.

In some embodiments of any of the above, the first IE circuitry further comprises a second, actively controlled impedance-compensation element electrically connected between second ends of the signal and ground paths and adapted to be controlled to selectively provide different impedance levels.

In some embodiments of any of the above, the first impedance-compensation element is implemented on a first board with the first electronic component, and the second impedance-compensation element is implemented on a second board with the second electronic component.

In some embodiments of any of the above, the first and second impedance-compensation elements comprise four varactor diodes electrically connected in an anti-parallel/anti-series configuration.

In some embodiments of any of the above, the first impedance-compensation element is implemented on a board with the first electronic component.

In some embodiments of any of the above, the first IE circuitry has a Pi-filter configuration, a T-filter configuration, an L-filter configuration, an H-filter configuration, or a Box-filter configuration.

In some embodiments of any of the above, the electronics further comprises one or more additional electronic components configured to control the impedance of the first impedance-compensation element.

In some embodiments of any of the above, the one or more additional electronic components comprise a digital-to-analog (D/A) converter electrically connected to a low-pass filter (LPF).

In some embodiments of any of the above, the one or more additional electronic components further comprises a pulse generator electrically connected to the LPF.

In some embodiments of any of the above, the first impedance-compensation element comprises a varactor diode.

In some embodiments of any of the above, the first impedance-compensation element comprises two varactor diodes electrically connected in an anti-series configuration.

In some embodiments of any of the above, the first impedance-compensation element comprises a switched-capacitor array.

In some embodiments of any of the above, the first impedance-compensation element comprises an electronically tunable capacitor.

In some embodiments of any of the above, the first electronic component is a transceiver, and the second electronic component is an RF filter.

In some embodiments of any of the above, further comprising one or more additional IE circuitries electrically interconnecting the transceiver and the RF filter.

In some embodiments of any of the above, the first electronic component is an RF filter, and the second electronic component is an antenna.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
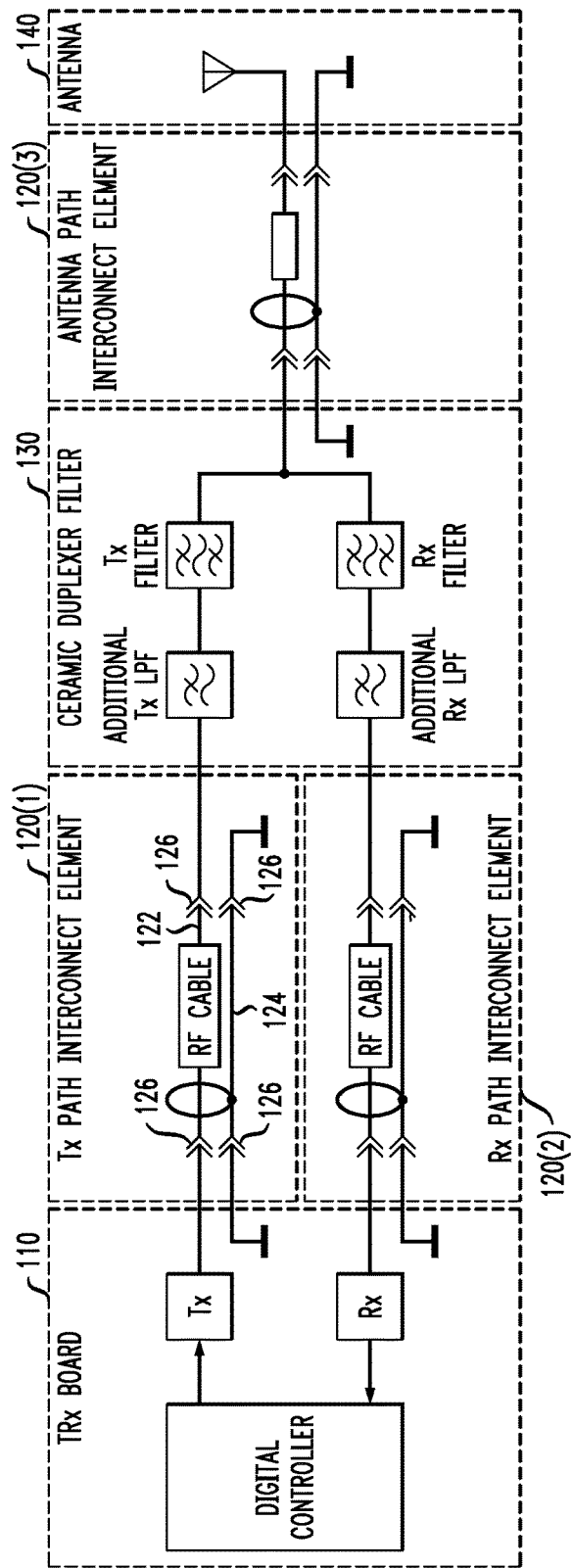
FIG. 1 is a high-level block diagram of a set of prior-art RF electronics having a one type of conventional interconnect elements.
Figure 2:
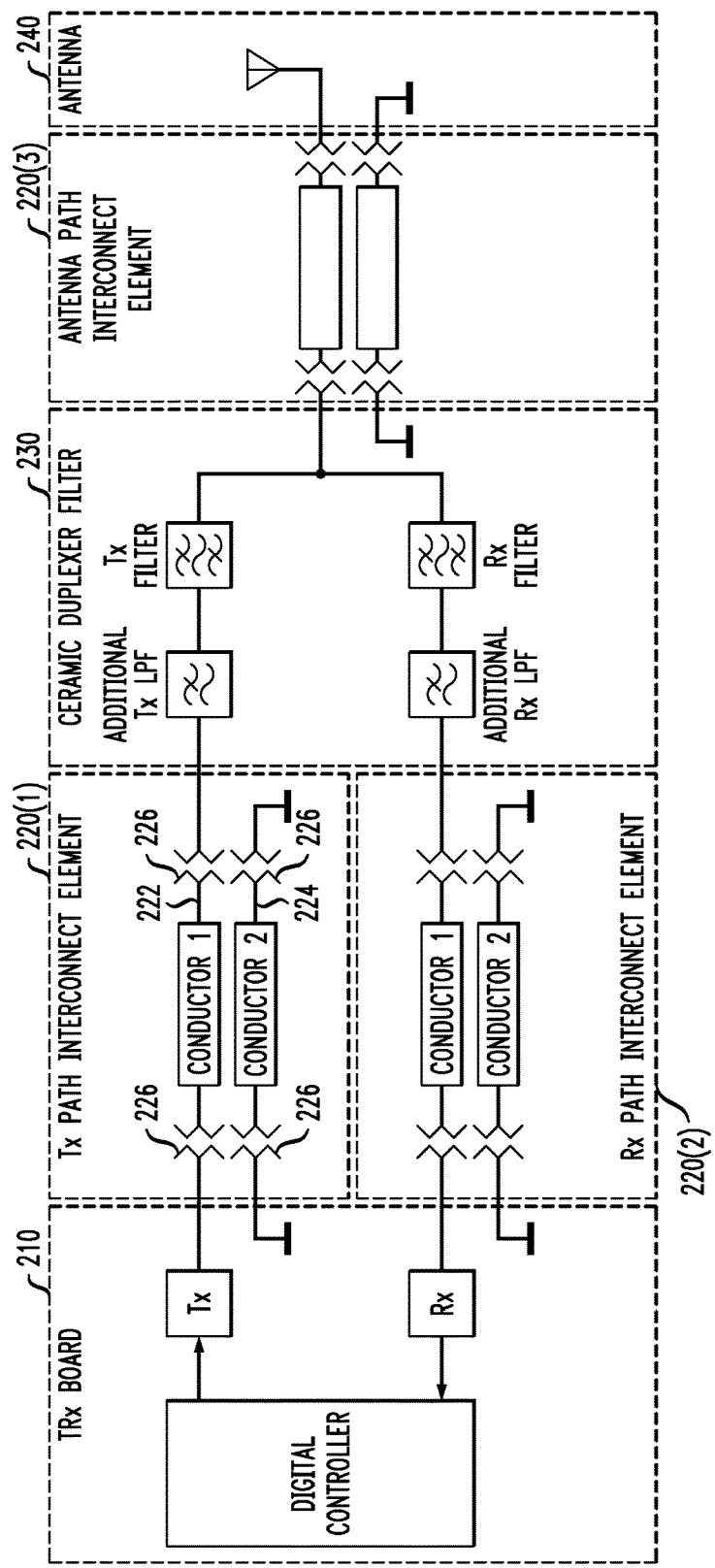
FIG. 2 is a high-level block diagram of another set of prior-art RF electronics having a different type of conventional interconnect elements.
Figure 3:
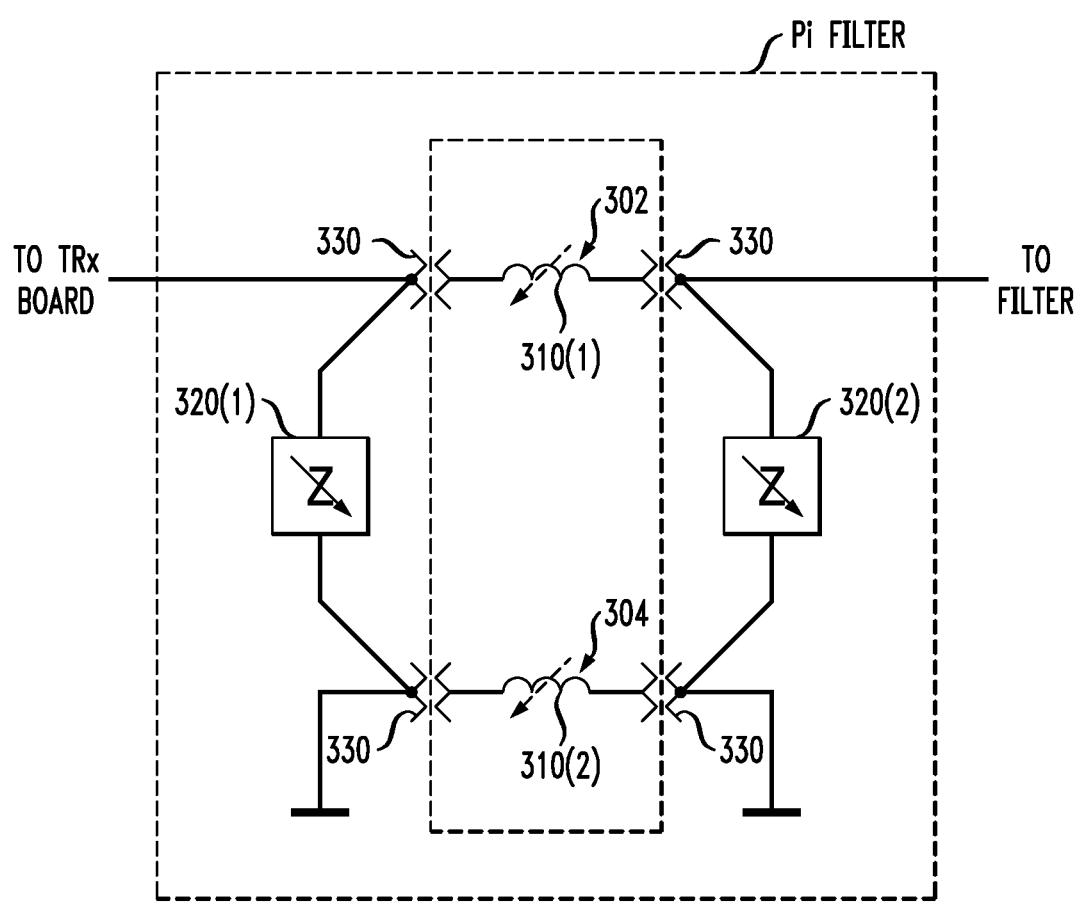
FIG. 3 is a block diagram of the equivalent circuit of interconnect element circuitry according to one embodiment of the invention.

FIG. 3 is a block diagram of the equivalent circuit of interconnect element circuitry 300 according to one embodiment of the invention. Interconnect element circuitry 300 can be used in place of the IEs 120 in FIG. 1 and the IEs 220 in FIG. 2. Like the IEs 220 of FIG. 2, instances of interconnect element circuitry 300 can be used to interconnect RF components with relatively simple joints 330 and without needing relatively expensive RF connectors, like RF connectors 126 of FIG. 1.

As shown in FIG. 3, interconnect element circuitry 300 has (i) a signal path 302 with a signal-path inductor 310(1) and (ii) a grounded return path 304 with a return-path inductor 310(2), where the corresponding end nodes of the inductors 310 are connected by impedance-compensation elements 320(1) and 320(2), which thereby also interconnect the signal and return paths 302 and 304.

The broken arrows in FIG. 3 indicate that the inductances of the inductors 310 can have some variation from their nominal (optimal) values due to variations in the manufacturing process or during the product operational lifetime due to aging, temperature variation, mechanical vibration, etc. The solid arrows in FIG. 3 indicate that the impedances of the impedance-compensation elements 320 can be actively controlled during the operational lifetime of the interconnect element circuitry 300. By actively controlling the impedances of the impedance-compensation elements 320, the desired impedance matching for IE circuitry 300 can be achieved and then maintained throughout the lifetime of the RF electronics that employs IE circuitry 300. As such, RF electronics designed with instances of connector-less IE circuitry 300 can provide long-term impedance matching at relatively low cost. In addition, the active control can change the IE circuitry original impedance matching condition (for example, pass-band and stop-band frequencies) if some operating conditions of the device are changed.

Figure 4:
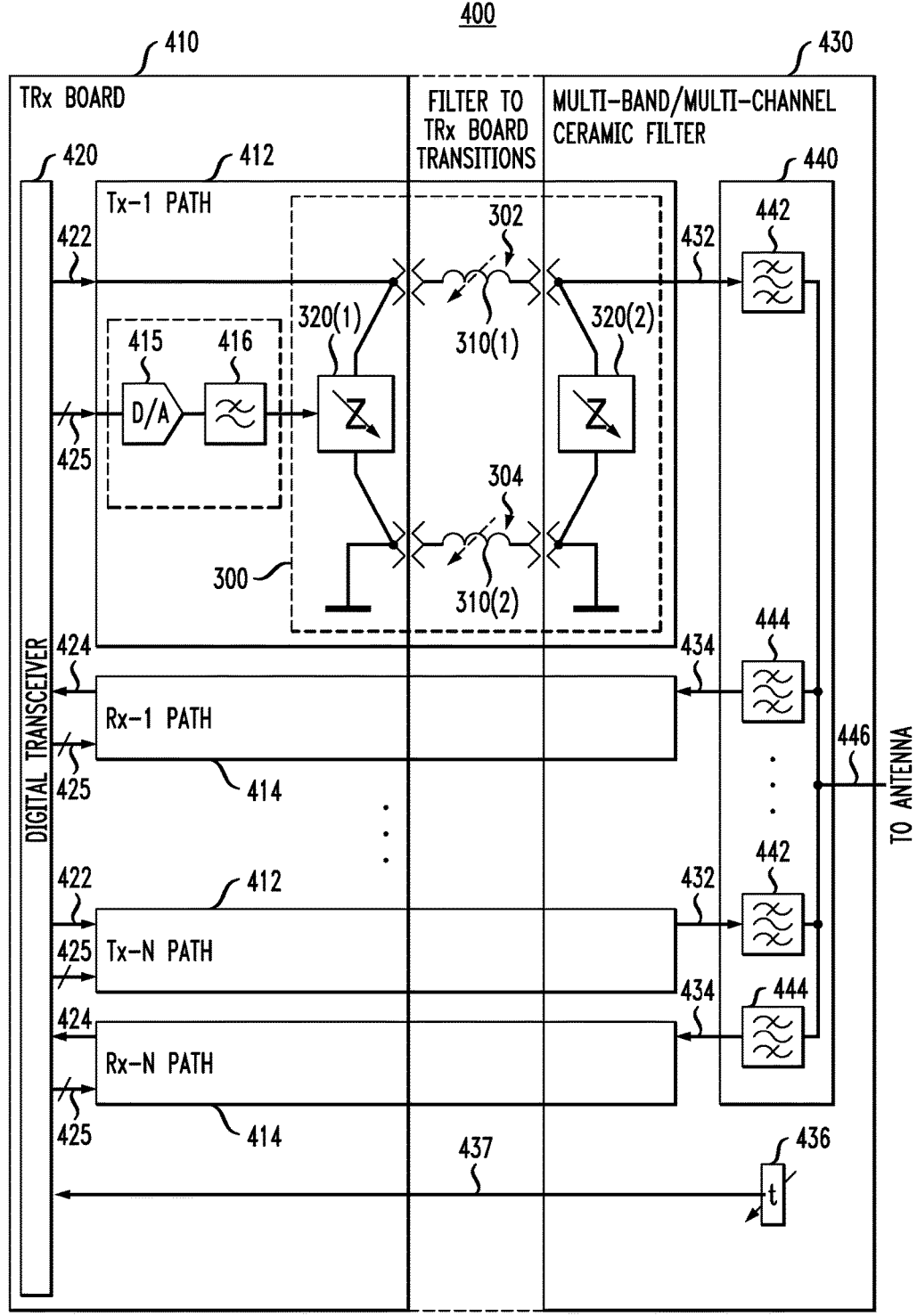
FIG. 4 is a block diagram of example RF electronics employing instances of the interconnect element circuitry of FIG. 3.

FIG. 4 is a block diagram of example RF electronics 400 employing instances of interconnect element circuitry 300 of FIG. 3. RF electronics 400 has a multi-channel digital transceiver 420 interconnected with a ceramic multiplexer filter 440 using multiple instances of IE circuitry 300 configured in either a transmit-path IE circuitry 412 or a receive-path IE circuitry 414. FIG. 4 shows the details of only one of the transmit-path IE circuitries 412 and the details of none of the receive-path IE circuitries 414, the main difference being the direction of flow of signals through the signal path 302.

The filter 440 comprises a plurality of transmit (TX) filters 442 having TX-channel ports 432 and a plurality of receive (RX) filters 444 having RX-channel ports 434, where the TX and RX filters 442 and 444 share a common antenna port 446. The transceiver 420 has a plurality of TX ports 422 and a plurality of RX ports 424 respectively connected with the corresponding filter TX-channel ports 432 and the corresponding filter RX-channel ports 434 through the corresponding TX-path IE circuitries 412 and the corresponding RX-path IE circuitries 414. The antenna (not shown) is connected with the filter's common antenna port 446 via antenna-path IE circuitry (also not shown), which is another instance of interconnect element circuitry 300 of FIG. 3.

As indicated in FIG. 4, each TX-path IE circuitry 412 also includes a digital-to-analog (D/A) converter 415 and a low-pass filter (LPF) 416, which together convert and filter digital control signals 425 generated by transceiver 420 to control the impedances of impedance-compensation elements 320(1) and 320(2) to achieve desired frequency characteristics. In addition, FIG. 4 shows temperature sensor 436, which provides temperature signal 437 to transceiver 420 for use in generating the control signals 425 in order to achieve the desired frequency characteristics at different operating temperatures. In other implementations, the control signals 425 can be generated to control for additional or other variables, such as variations due to process, voltage, and/or time. Although not shown in FIG. 4, each RX-path IE circuitry 414 also includes an analogous D/A converter, an analogous LPF, and an analogous instance of IE circuitry 300 of FIG. 3.

As indicated in FIG. 4, the D/A converter 415, the LPF 416, and the impedance-compensation element 320(1) are implemented on a transceiver board 410 along with the transceiver 420. Similarly, the impedance-compensation element 320(2) is implemented on a filter board 430 along with the filter 440.

Regarding the desired frequency characteristics, each interconnect element circuitry 300 is designed to provide good bandpass characteristics within a desired frequency range (i.e., the corresponding channel pass-band) and good bandstop characteristics at certain frequencies (i.e., one or more corresponding channel stop-bands) outside of the desired frequency range, especially at frequencies higher than the channel pass-band. In particular, within the channel pass-band, IE circuitry 300 provides good impedance matching with its interconnected components (i.e., transceiver 420 and filter 440), thereby providing low insertion loss within a desired frequency range. In addition, within the stop-band(s), IE circuitry 300 provides significant impedance mismatching with its interconnected components, thereby resulting in significant signal reflections that enhance stop-band attenuation. Note that the reflective filter has impedance mismatch in a stop-band, which implies high signal reflection in the stop-band, which implies high stop-band attenuation.

In order to compensate for variations in the substantially inductive signal and return paths 302 and 304, the impedance-compensation elements 320 can be designed to be substantially capacitive or a suitable combination of capacitive and inductive. For example, when each impedance-compensation element 320 is equivalent to a series combination of a capacitor and an inductor, the IE circuitry will function as a band-stop filter with corresponding transmission zero(s) (AKA notch(es)).

Interconnect element circuitry 300 of FIG. 3 has the architecture of a Pi filter. According to alternative embodiments of the invention, IE circuitry can be designed to have other architectures, such as the architecture of a T filter or an L-filter for a single-ended/unbalanced IE configuration or the architecture of an H-filter or a Box-filter for a differential/balanced IE configuration.

Figure 5:
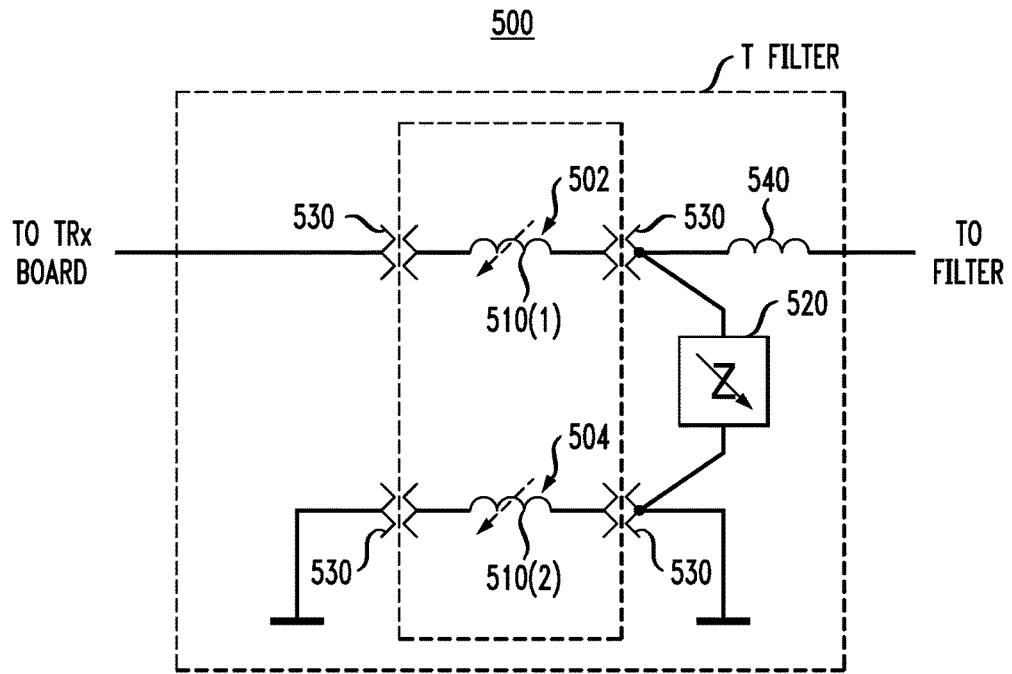
FIG. 5 is a block diagram of the equivalent circuit of interconnect element circuitry according to an embodiment of the invention having the architecture of a T filter.

FIG. 5 is a block diagram of the equivalent circuit of interconnect element circuitry 500 according to an embodiment of the invention. Interconnect element circuitry 500 is equivalent to IE circuitry 300 of FIG. 3 with analogous elements having analogous labels except that IE circuitry 500 has only one impedance-compensation element 520. In addition, inductor 540 is (optionally) added. In the implementation of FIG. 5, the single impedance-compensation element 520 is implemented on the filter side of the IE circuitry 500. In other implementations, the single impedance-compensation element may be implemented on the transceiver side of the IE circuitry, in which case, the inductor 540 would also be implemented on the transceiver side. Such implementations may be preferable when the control signal for the impedance-compensation element is generated on the transceiver side in order to avoid having to pass the control signal from the transceiver side to the filter side. Like IE circuitry 300, IE circuitry 500 can be used in place of the IEs 120 in FIG. 1 and the IEs 220 in FIG. 2 without needing RF connectors. Single-element IE circuitry 500 implements a T-filter configuration and is less expensive than the two-element IE circuitry 300 of FIG. 3, implementing a Pi-filter configuration. Note that the filter shape and stop-band attenuation depend on the filter order. T and Pi filters, which are third-order filters, have similar performance. An L-filter, which is a second-order filter, costs less, but has lower stop-band attenuation.

IE circuitries 300 and 500 of FIGS. 3 and 5 have single-ended configurations with only one signal path and are suitable for the integration of RF filter modules. In other implementations, IE circuitries can have differential configurations with two identical signal paths and are suitable for the integration of high-speed digital modules having high-speed clock signals. Note that RF signals can also have differential configurations.

In order to be able to control the frequency characteristics of IE circuitry 300 of FIG. 3, one or both of the impedance-compensation elements 320 has one or more controllable impedance devices such as (without limitation) a varactor diode, a switch capacitor array, an electronically tunable non-volatile capacitor, and/or a capacitor having dielectric with a tunable dielectric constant. The inductors 310 of FIG. 3 and the inductors 510 of FIG. 5 can be implemented as lumped inductors (for example, bond wires or foil/strip conductors) having low resistance and therefore high Q-factor.

Figure 6:
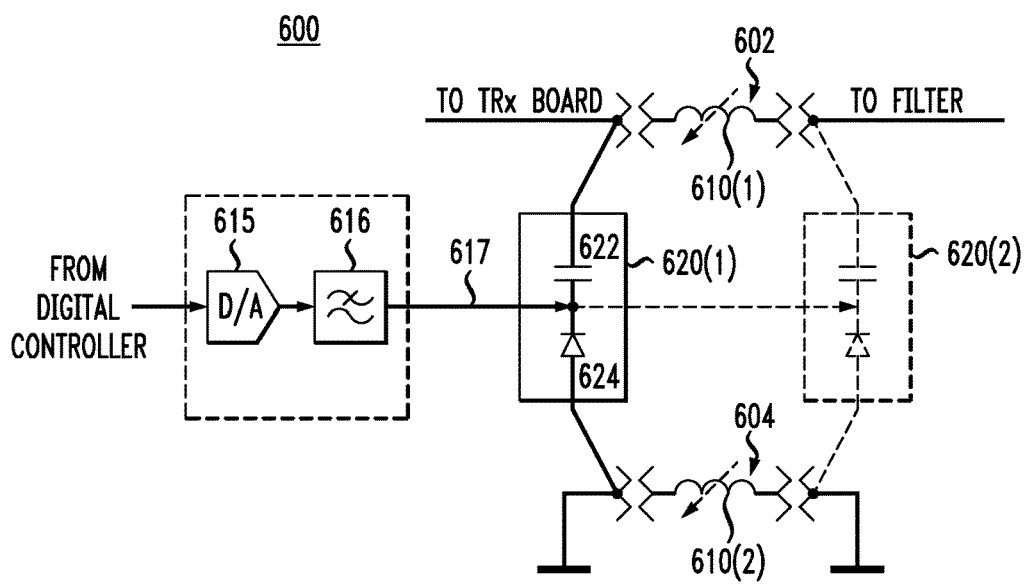
FIG. 6 is a block diagram of the equivalent circuit of interconnect element circuitry according to embodiments of the invention in which at least one impedance-compensation element is implemented using a capacitor in series with a controllable varactor diode.

FIG. 6 is a block diagram of the equivalent circuit of interconnect element circuitry 600 according to embodiments of the invention in which at least one impedance-compensation element 620 is implemented using a capacitor 622 in series with a controllable varactor diode 624. As indicated in FIG. 6 by the dotted lines, IE circuitry 600 can be implemented with two impedance-compensation elements 620(1) and 620(2) or with only one impedance-compensation element (e.g., 620(1)). One of the impedance-compensation elements, for example 620(2), can be implemented as a lumped or distributed capacitor.

D/A converter 615 and LPF 616 generate control signal 617 as a biasing voltage that controls the capacitance of varactor diode 624. In order to reduce noise in that biasing voltage that can result in degraded system performance, the analog LPF 616 functions as a band-limiting reconstruction filter that blocks spurious, high-frequency components in the analog output of the D/A converter 615.

Figure 7:
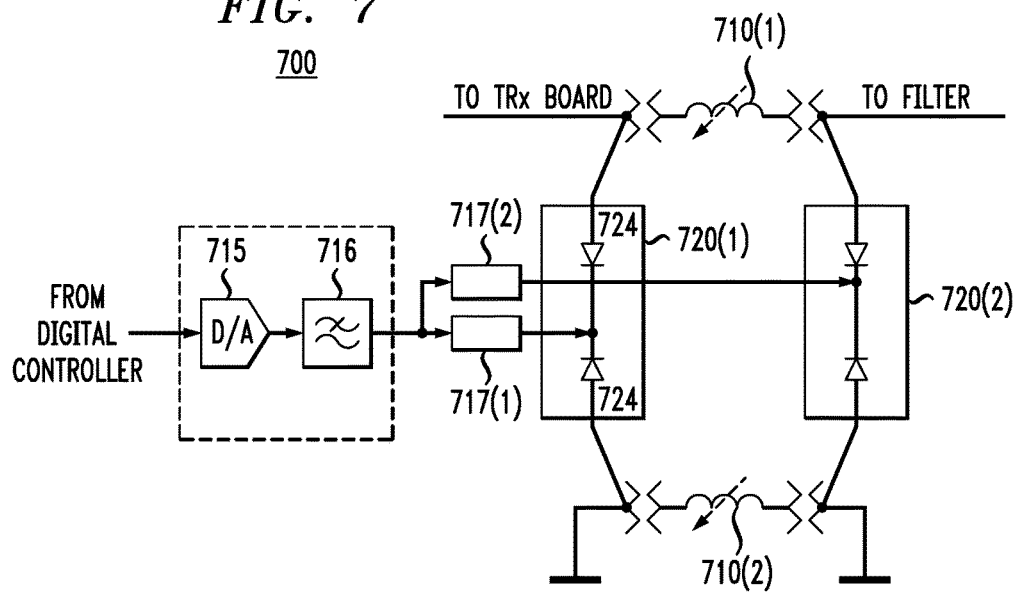
FIG. 7 is a block diagram of the equivalent circuit of interconnect element circuitry according to an embodiment of the invention in which each impedance-compensation element is implemented using two varactor diodes electrically connected in an anti-series configuration, while the four varactor diodes of the first and the second impedance-compensation elements are electrically connected in an anti-parallel/anti-series configuration.

FIG. 7 is a block diagram of the equivalent circuit of interconnect element circuitry 700 according to an embodiment of the invention in which each impedance-compensation element 720 is implemented using two varactor diodes 724 electrically connected in an anti-series configuration, while the four varactor diodes 724 of the two impedance elements 720(1) and 720(2) are electrically connected in an anti-parallel/anti-series configuration. In this embodiment, each impedance-compensation element 720 has its own corresponding biasing circuit 717, which is designed to optimize/increase linearity of the corresponding varactor circuitry and eliminate/reduce signal distortion. Each biasing circuit may be a biasing resistor cascaded with the corresponding pair of the anti-parallel varactor diodes 724. Using two independent biasing circuits 717 improves stability of the operation of the varactor diodes 724 in compensating for parameter variations due to manufacturing, temperature, and aging. Note that similar biasing circuits can be employed for each varactor diode 624 in IE circuitry 600 of FIG. 6. Note further that IE circuitry 600 and IE circuitry 700 can alternatively be implemented with only one impedance-compensation element 620/720.

The IE circuitry 600 of FIG. 6 is suitable for lower-power applications, while the IE circuitry 700 of FIG. 7 has greater linearity and can therefore be used for higher-power applications, such as TX channels.

Figure 8:
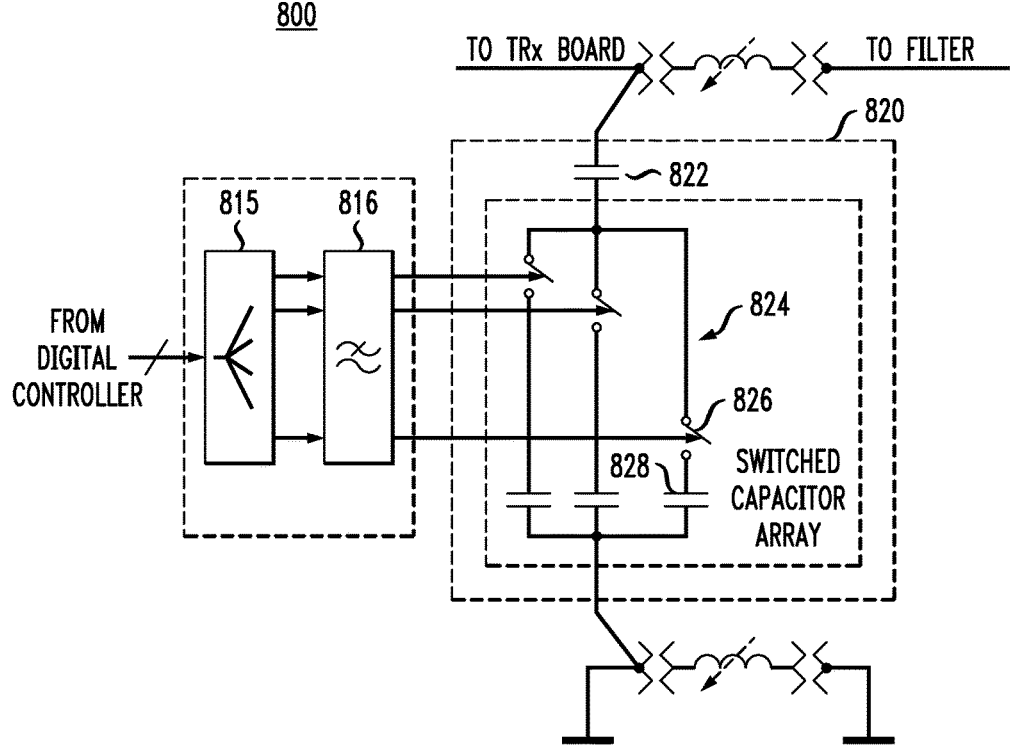
FIG. 8 is a block diagram of the equivalent circuit of interconnect element circuitry according to an embodiment of the invention in which the single impedance-compensation element is implemented using a capacitor connected in series with a switched-capacitor array.

FIG. 8 is a block diagram of the equivalent circuit of interconnect element circuitry 800 according to an embodiment of the invention in which the single impedance-compensation element 820 is implemented using a capacitor 822 connected in series with a switched-capacitor array of parallel switched-capacitor legs 824, each leg having a transistor-based switch 826 connected in series with a capacitor 828. In this case, D/A converter 815 is a demultiplexing D/A converter, and LPF 816 is a low-pass filter bank. Note that IE circuitry 800 has an L-filter configuration and can alternatively be implemented as a Pi-filter with two impedance-compensation elements 820 or with one lumped capacitor, or as a T-filter having an additional lumped inductor.

Figure 9:
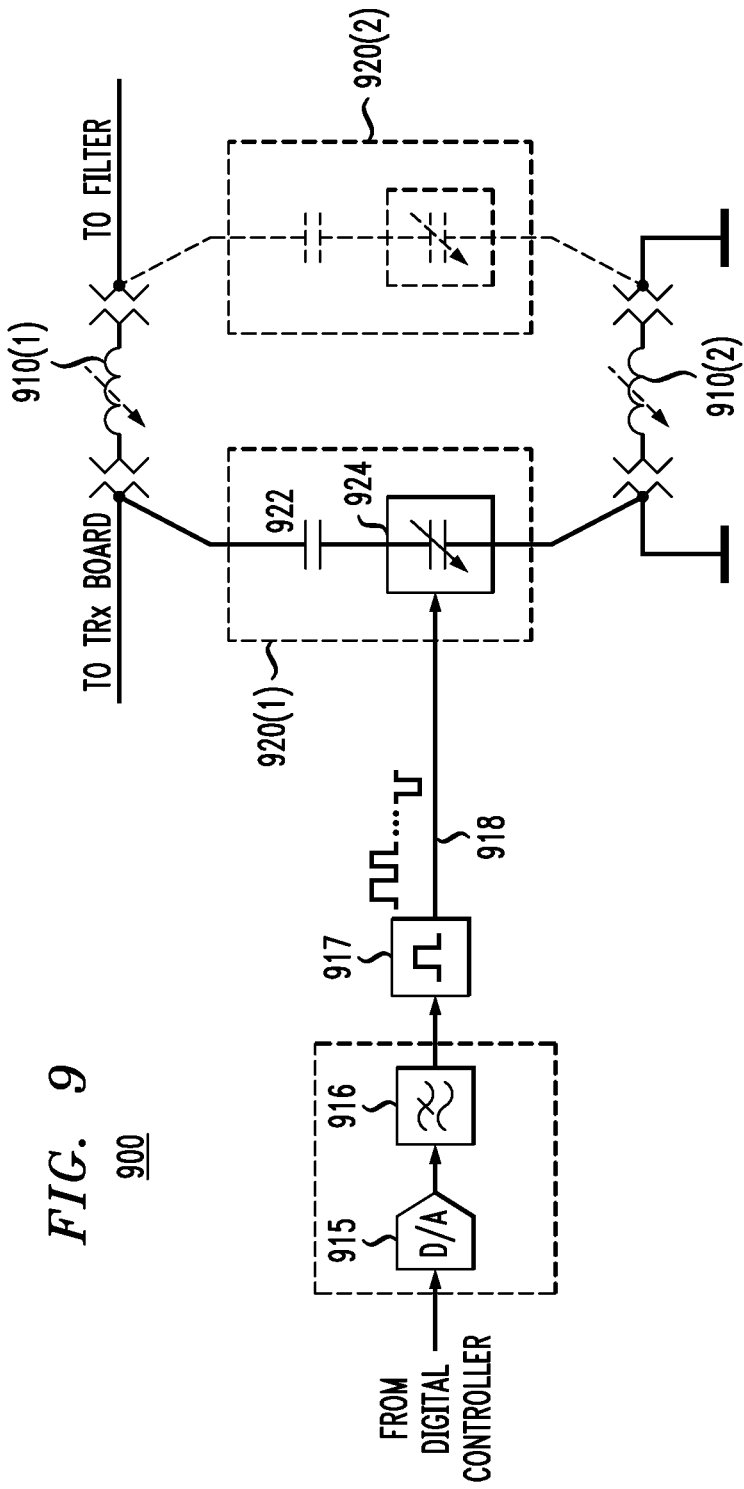
FIG. 9 is a block diagram of the equivalent circuit of interconnect element circuitry according to embodiments of the invention in which at least one impedance-compensation element is implemented using a capacitor in series with an electronically tunable, non-volatile capacitor.

FIG. 9 is a block diagram of the equivalent circuit of interconnect element circuitry 900 according to embodiments of the invention in which at least one impedance-compensation element 920 is implemented using a capacitor 922 in series with an electronically tunable, non-volatile capacitor 924. The pulse generator 917, which is controlled by the analog control signal generated by D/A converter 915 and LPF 916, generates an electric pulse sequence 918 having pulse polarity, amplitude, duration, and/or number designed to control the tunable capacitor 924 to have a desired capacitance. See U.S. Patent Publication No. 2004/0065912 A1, the teachings of which are incorporated herein by reference.

Figure 10:
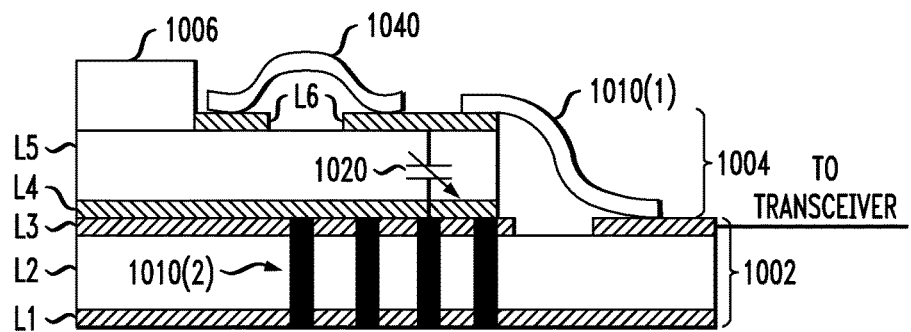
FIG. 10 is a cross-sectional side view of interconnect element circuitry having an equivalent circuit similar to that of the IE of FIG. 5 according to one possible implementation.

FIG. 10 is a cross-sectional side view of interconnect element circuitry 1000 having an equivalent circuit similar to that of IE circuitry 500 of FIG. 5 according to one possible implementation. As shown in FIG. 10, IE circuitry 1000 comprises a stack of filter board 1006 on top of IE board 1004 on top of transceiver board 1002. Transceiver board 1002 includes metal layers L1 and L3 and dielectric or semiconductor layer L2, while IE board 1004 includes metal layers L4 and L6 and dielectric or semiconductor layer L5. Metal strip or bond-wire 1010(1) functions as the signal-path inductor 510(1) of FIG. 5, metal strip or bond-wire 1040 functions as inductor 540 of FIG. 5, and metal vias 1010(2) function as the return-path inductor 510(2) of FIG. 5. Within the IE board 1004 is an active capacitor 1020, which functions as the impedance-compensation element 520 of FIG. 5. Note that active capacitor 1020 is represented schematically in FIG. 10. The exact integrated circuit (IC) structure of active capacitor 1020 will depend on what type of active capacitor is implemented, as in the examples of FIGS. 6-9.

Figure 11:
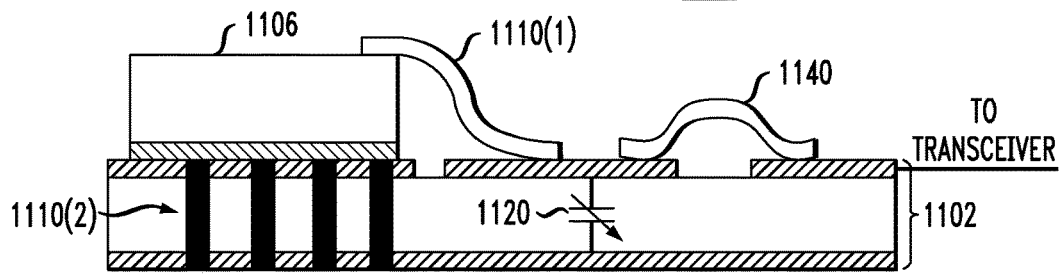
FIG. 11 is a cross-sectional side view of interconnect element circuitry having an equivalent circuit similar to that of the IE of FIG. 5 according to another possible implementation.

FIG. 11 is a cross-sectional side view of interconnect element circuitry 1100 having an equivalent circuit similar to that of IE circuitry 500 of FIG. 5 according to another possible implementation. IE circuitry 1100 is similar to IE circuitry 1000 of FIG. 10 with analogous elements having analogous labels, but where the active capacitor 1120 and inductor 1140 are implemented within the transceiver board 1102, and there is no distinct IE board.

Note that IE circuitry 1000 of FIG. 10 and IE circuitry 1100 of FIG. 11 have T-filter architectures.

Figure 12:
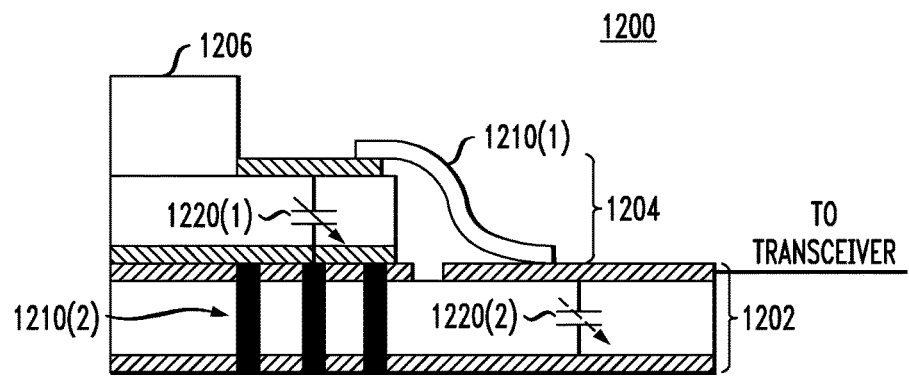
FIG. 12 is a cross-sectional side view of interconnect element circuitry having an equivalent circuit similar to that of the IE of FIG. 3 according to one possible implementation having a Pi-filter architecture.

FIG. 12 is a cross-sectional side view of interconnect element circuitry 1200 having an equivalent circuit similar to that of IE circuitry 300 of FIG. 3 according to one possible implementation having a Pi-filter architecture. IE circuitry 1200 is similar to IE circuitry 1000 of FIG. 10 analogous labels, but where one impedance-compensation element 1220(1) is implemented within the IE board OQ and the other impedance-compensation element 1220(2) is implemented within the transceiver board OG. As indicated by the broken arrow, IE circuitry 1200 can be implemented with one of the impedance-compensation elements, for example 1220(2), as a lumped capacitor.

Although the disclosure has been described in the context of interconnect elements having one or more actively controlled impedance elements, in other embodiments, the IE circuitries are passive elements that do not have any actively controlled impedance elements. Such IE circuitries may be tuned during manufacturing to have the desired RF frequency characteristics (i.e., frequency-dependent impedance matching) to achieve the goals of low pass-band insertion loss and high stop-band attenuation.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding terminals, nodes, ports, or paths may be referred to by the same name and are interchangeable for purposes here.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. An article of manufacture comprising electronics comprising:
    a first electronic hardware component;
    a second electronic hardware component; and
    first interconnect element (IE) circuitry providing an electrical connection between the first and second electronic hardware components, wherein the first IE circuitry comprises:
        a signal path electrically connected between the first and second electronic hardware components and having a signal-path inductance;
        a return path electrically connected to ground and having a return-path inductance; and
        a first, actively controlled impedance-compensation element electrically connected between first ends of the signal and ground paths and adapted to be controlled to selectively provide different impedance levels, such that impedance of the first IE circuitry is controllable to achieve low pass-band insertion loss and high stop-band attenuation between the first and second electronic hardware components, wherein:
        the first electronic hardware component is physically configured on a first board;
        the second electronic hardware component is physically configured on a second board;
        the signal path of the first IE circuitry is part of the electrical connection between the first electronic hardware component on the first board and the second electronic hardware component on the second board;
        the return path of the first IE circuitry is part of an electrical connection between ground on the first board and ground on the second board;
        the first end of the signal path is on the first board;
        the first end of the return path is on the first board; and
        the first, actively controlled impedance-compensation element is connected between the first end of the signal path on the first board and the first end of the return path on the first board.

2. The article of claim 1, wherein the first IE circuitry is electrically connected to the first and second electronic hardware components via joints.

3. The article of claim 1, wherein the first IE circuitry further comprises a second, actively controlled impedance-compensation element electrically connected between second ends of the signal and ground paths and adapted to be controlled to selectively provide different impedance levels.

4. The article of claim 3, wherein:
the first impedance-compensation element is implemented on a first board with the first electronic hardware component; and
the second impedance-compensation element is implemented on a second board with the second electronic hardware component.

5. The article of claim 3, wherein the first and second impedance-compensation elements comprise four varactor diodes electrically connected in an anti-parallel/anti-series configuration.

6. The article of claim 1, wherein the first impedance-compensation element is implemented on a board with the first electronic hardware component.

7. The article of claim 1, wherein the first IE circuitry has a Pi-filter configuration, a T-filter configuration, an L-filter configuration, an H-filter configuration, or a Box-filter configuration.

8. The article of claim 1, wherein the electronics further comprises one or more additional electronic hardware components configured to control the impedance of the first impedance-compensation element.

9. The article of claim 8, wherein the one or more additional electronic hardware components comprise a digital-to-analog (D/A) converter (e.g., 415) electrically connected to a low-pass filter (LPF).

10. The article of claim 9, wherein the one or more additional electronic hardware components further comprises a pulse generator electrically connected to the LPF.

11. The article of claim 1, wherein the first impedance-compensation element comprises a varactor diode.

12. The article of claim 1, wherein the first impedance-compensation element comprises two varactor diodes electrically connected in an anti-series configuration.

13. The article of claim 1, wherein the first impedance-compensation element comprises a switched-capacitor array.

14. The article of claim 1, wherein the first impedance-compensation element comprises an electronically tunable capacitor.

15. The article of claim 1, wherein:
the first electronic hardware component is a transceiver; and
the second electronic hardware component is an RF filter.

16. The article of claim 15, further comprising one or more additional IE circuitries electrically interconnecting the transceiver and the RF filter.

17. The article of claim 1, wherein:
the first electronic hardware component is an RF filter; and
the second electronic hardware component is an antenna.

18. The article of claim 1, wherein:
the first IE circuitry further comprises a second, actively controlled impedance-compensation element;
a second end of the signal path is on the second board;
a second end of the return path is on the second board; and
the second, actively controlled impedance-compensation element is connected between the second end of the signal path on the second board and the second end of the return path on the second board.

19. The article of claim 1, wherein the signal path of the first IE circuitry is a lumped inductor formed by a bond wire, a foil conductor, or a strip conductor.

* * * * *